United States Patent
Rodniansky et al.

(10) Patent No.: US 11,228,607 B2
(45) Date of Patent: Jan. 18, 2022

(54) GRACEFUL TERMINATION OF SECURITY-VIOLATION CLIENT CONNECTIONS IN A NETWORK PROTECTION SYSTEM (NPS)

(71) Applicant: International Business Machines Corporation, Armonk, NY (US)

(72) Inventors: Leonid Rodniansky, Allston, MA (US); Viktor Ginzburg, Newton Center, MA (US); Richard Ory Jerrell, Manchester, NH (US); Galia Diamant, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 16/679,164

(22) Filed: Nov. 9, 2019

(65) Prior Publication Data

US 2021/0144160 A1    May 13, 2021

(51) Int. Cl.
*H04L 29/06* (2006.01)
*H04L 29/08* (2006.01)

(52) U.S. Cl.
CPC ...... *H04L 63/1425* (2013.01); *H04L 63/1441* (2013.01); *H04L 63/168* (2013.01); *H04L 67/42* (2013.01); *H04L 69/22* (2013.01); *H04L 69/326* (2013.01); *H04L 67/10* (2013.01)

(58) Field of Classification Search
CPC . H04L 63/1425; H04L 63/1441; H04L 67/42; H04L 67/10; H04L 69/22
See application file for complete search history.

(56) References Cited

U.S. PATENT DOCUMENTS

| | | | |
|---|---|---|---|
| 9,661,018 B1 | 5/2017 | Aziz | |
| 10,171,495 B1* | 1/2019 | Bowen | G06N 7/005 |
| 2009/0234972 A1* | 9/2009 | Raghu | H04L 67/02 709/246 |
| 2011/0099633 A1 | 4/2011 | Aziz | |
| 2016/0219024 A1 | 7/2016 | Verzun et al. | |
| 2017/0006113 A1* | 1/2017 | Singhal | H04L 69/22 |
| 2017/0126709 A1 | 5/2017 | Baradaran et al. | |
| 2019/0386969 A1* | 12/2019 | Verzun | H04L 63/102 |

* cited by examiner

*Primary Examiner* — Minh Chau Nguyen
(74) *Attorney, Agent, or Firm* — Jeffrey S. LaBaw; David H. Judson

(57) ABSTRACT

A network protection system (NPS) is augmented to provide additional functionality—preferably within the SSL/TLS connection at the OSI presentation layer—to enable efficient management and handling of security-violating client connections. When the NPS determines to suspend a suspect application client connection, the NPS modifies the request (the TLS encrypted packet) at a random offset to include a random byte value. When the modified request is then received at the server, a TLS decryption error occurs. In response, the server drops the request gracefully and, in particular, a termination response is returned from the server to the NPS, which then passes the termination response back to the requesting client.

18 Claims, 4 Drawing Sheets

700

```
00000000 : 17 03 01 00 64 ca 74 9e bd db 37 36 67 1f 33 2c   ....d.t...76g.3,
00000010 : 7f 70 bf 0d 7b a5 0f e5 26 15 43 a6 f8 0e 33 38   .p..{...&.C...38
00000020 : af ce 6f c0 cd e8 da ac 21 6f 4f e8 82 56 66 fc   ..o.....!oO..Vf.
00000030 : bd 2d 85 76 45 54 3a 23 91 a5 55 54 55 25 b8 b0   .-.vET:#..UTU%..
00000040 : fd eb ae 29 77 34 51 ec f7 72 86 1a 91 ca 07 01   ...)w4Q..r......
00000050 : 85 69 45 a1 5d bc d5 f7 c5 3f 55 cb 0f a4 f6 92   .iE.]....?U.....
00000060 : 8a ec 88 ff e9 ef cb 58 82                        .......X.
```
                                                        ↖702

GRACEFUL TERMINATION OF SECURITY-VIOLATION CLIENT CONNECTIONS IN A NETWORK PROTECTION SYSTEM (NPS)

BACKGROUND OF THE INVENTION

Technical Field

This disclosure relates generally to securing resources in a distributed computing environment.

Background of the Related Art

Modern information processing environments typically use an application-server model instead of a traditional client-server model. The application server-based architecture allows each application to perform specific and/or specialized portions of processing before handing a transaction or data stream off to a successive processing tier. An application-server model may utilize a multi-tier arrangement or architecture. In a multi-tier arrangement, each tier is responsible for performing a particular aspect of processing, e.g., database or application tiers can process different data. Different tiers communicate by passing or transmitting data, often according to a predetermined protocol or data structure. A business transaction is therefore passed between tiers, which may be successive layers or nodes in the processing stream. Accordingly, each tier "layer" receives a transaction from a preceding layer.

A multi-tier architecture of this type may include or be associated with a network protection solution/system (NPS). Systems of this type monitor transactions to identify suspicious behavior, and then terminate requests when a security anomaly or violation is detection. Communications between the client and the server typically are secure in that the occur over SSL/TLS (i.e. at the Open Systems Interconnection (OSI) presentation layer 6). In a typical operation, the system analyzes an access request by a client application, typically by monitoring a network or local access to a server, thereby enabling monitoring of transactions to identify the suspicious behavior. In a typical solution, an agent (which may be a proxy, or other monitoring functionality) operates to monitor both requests (to the server) and responses (from the server). The requests and responses are forwarded to a security mechanism, which typically includes various components, such as a protocol analyzer module, a statements/commands parser, a policy (security rules) validation module, and a security enforcing (or alerting) module (SEM). The security mechanism is configured to examine the requests and the responses. In an example embodiment, the NPS provides access control. In particular, a query that is sent by the client application to the server is extracted from the application protocol packets intercepted by the agent; the security mechanism then parses this query up to an application object level, validates the query against one or more security policies for a potential application object access violation, and issues an appropriate alert if an access violation is detected. The system may also suspend client connection(s) when a security anomaly or violation is detected.

Known NPS mechanisms include logic to terminate a connection when a security anomaly/violation is identified. Typically, the standard way to terminate the client connection is to close it at the transport layer, e.g., closing a socket or pipe, detaching a shared memory segment, or the like. When this occurs, however, the client side of the connection sees an ungraceful broken connection. An alternative technique to terminate an anomalous application connection involves rewriting the application layer request, or by sending an error response to the client. These techniques, however, are application-specific and thus do not provide for a universal solution that can be used regardless of the application protocol.

Thus, there remains a need to provide an improved way of handling security-violating client connections in a network protection solution. The technique of this disclosure addresses this need.

BRIEF SUMMARY

A network protection system (NPS) is augmented according to this disclosure to provide additional functionality—preferably within the SSL/TLS connection at the OSI presentation layer—to enable efficient management and handling of security-violating client connections. To this end, when the NPS determines to suspend a suspect application client connection (e.g., because a security anomaly or violation has been identified), preferably the NPS modifies (alters) the request (the TLS encrypted packet) at a random offset to include a random byte value. When the modified request is then received at the server, a TLS decryption error occurs, as inclusion of the random byte value in the modified TLS request prevents the request from being decrypted. In response, the server drops the request gracefully and, in particular, a termination response is returned from the server to the NPS, which then passes the termination response back to the requesting client. Because the operation takes place at the presentation layer, the NPS itself is not required to decrypt the traffic, and thus it does not have to understand the application protocol structure. When the NPS determines that the violation involves compromise of key material itself (e.g., a session key), additional random changes may be applied to the packet by the NPS to ensure that the connection cannot succeed at the server.

Regardless of the number of random byte values inserted into the request (before it is passed from NPS to the server), the reason that the connection failure has occurred is obscured from the requesting client. Thus, even if the client then re-establishes or attempts to re-establish the connection, the malicious request containing the violation is already blocks from being handled by the server.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the subject matter herein and the advantages thereof, reference is now made to the following descriptions taken in conjunction with the accompanying drawings, in which.

DETAILED DESCRIPTION OF AN ILLUSTRATIVE EMBODIMENT

Figure 1:
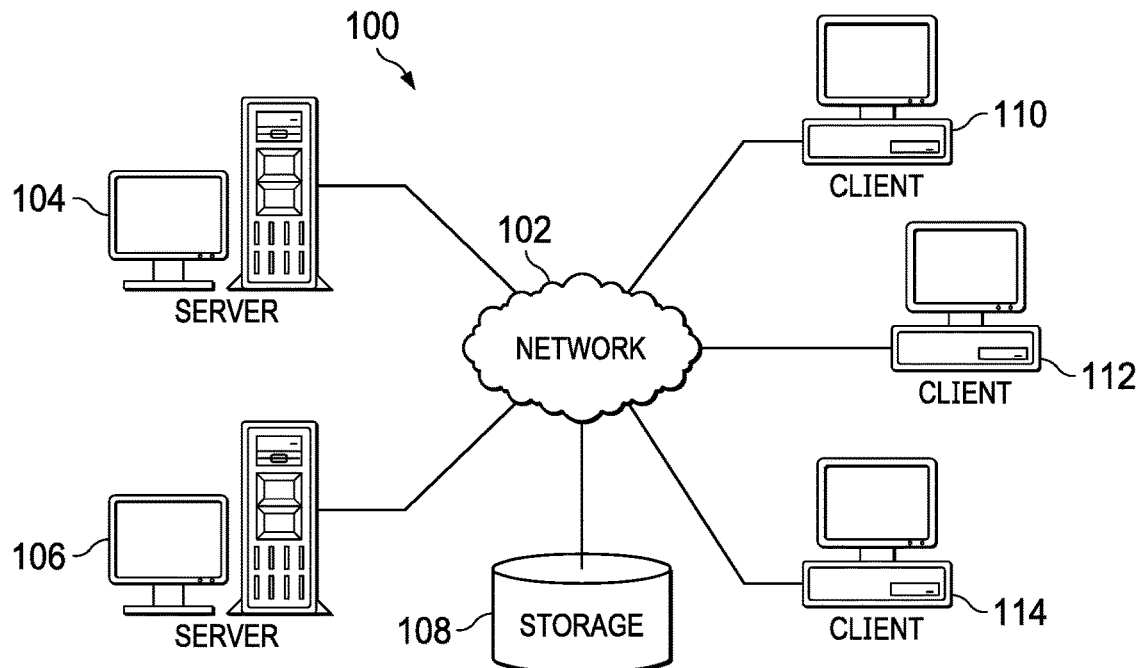
FIG. 1 depicts an exemplary block diagram of a distributed data processing environment in which exemplary aspects of the illustrative embodiments may be implemented.
Figure 2:
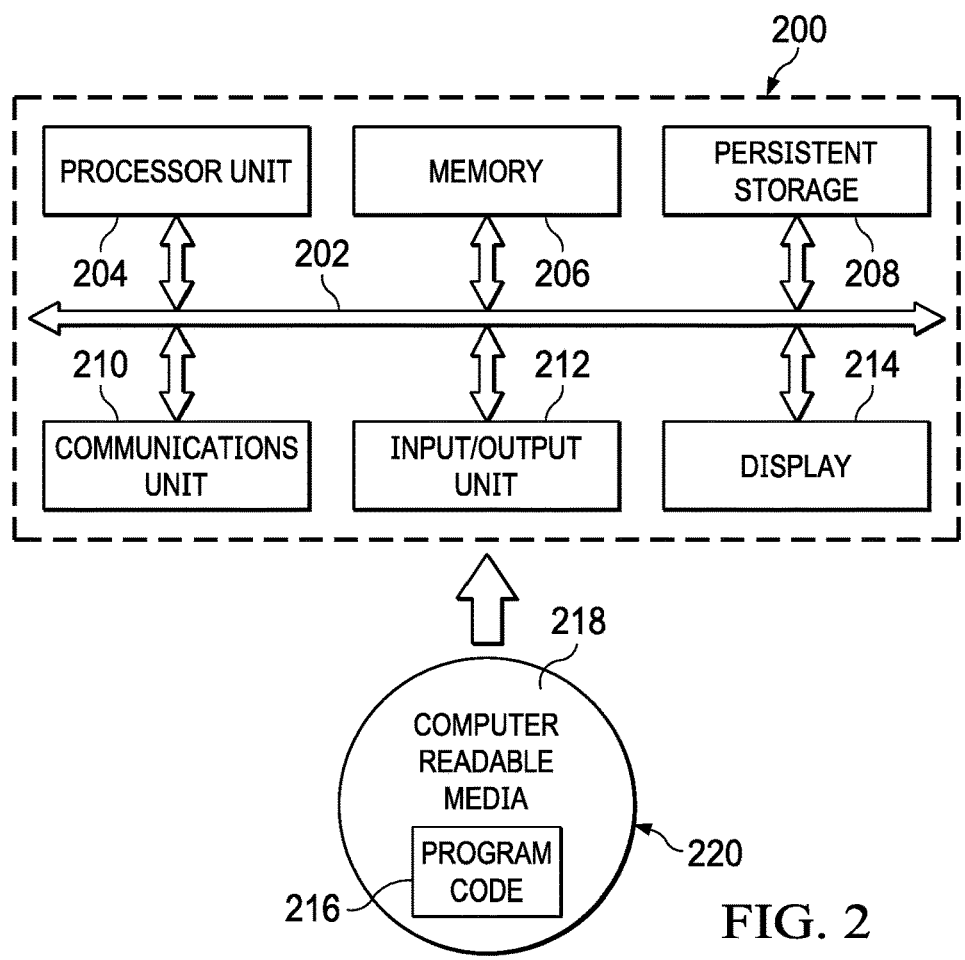
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the symmetric multi-processing (SMP) system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

In a representative but non-limiting implementation, the techniques herein are described in the context of a transaction-processing system or environment that comprises distributed and mainframe components, working cooperatively to respond to HTTP and Web Service client end-user service or transaction requests. Such a system or environment typically comprises multiple components, configured in a distributed manner. A distributed component of a larger multi-component transaction-processing environment typically comprises at least a computer, operating system platform, applications, networking and an associated security engine that provides distributed transaction processing functions, such as networking interactions with the client end-user, and identification and authentication functions in HTTP and Web Services scenarios. The transaction-processing system or environment of this type typically also includes a mainframe component that includes at least a computer, operating system platform, applications, networking and associated security engine that provides high performance back-end transaction processing and large database functionality.

Monitored Server Security Systems

Figure 3:
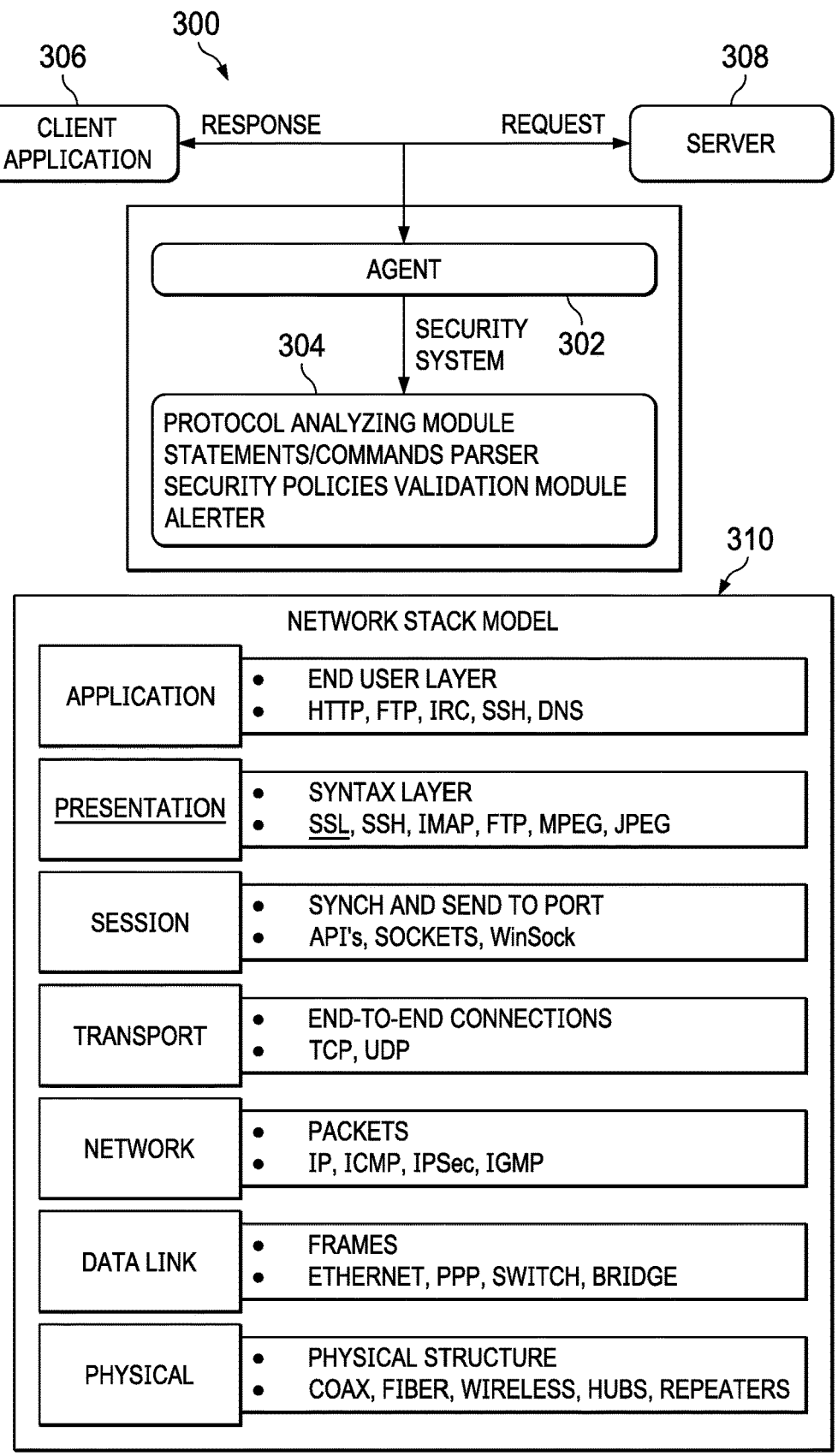
FIG. 3 depicts a generalization of a security system for monitoring a server in a client-server operating environment.

As described above, it is known to protect servers using intrusion detection. Security systems of this type typically analyze server access attempts by monitoring a network or local access to the server. FIG. 3 depicts a general solution of this type. As depicted, in this system 300 a client application 306 interacts with a server 308, and an agent 302 (which may be a proxy, or other monitoring functionality) operates to monitor both requests (to the server) and responses (from the server). The requests and responses are forwarded to a security mechanism 304. The security mechanism 304 typically includes various components, namely, a protocol analyzer module, a statements/commands (or "statement/command") parser, a policy validation module, and a security enforcement module (e.g., an SEM). Generally, the security mechanism is configured to examine the requests and the responses.

In particular, the agent 302 is configured to examine the application protocol request or response. Such a request/response is represented in the form of application protocol structure. Different types of clients/servers use different application protocol and statements/commands languages, although typically the request and response flow is common. Typically, a request contains application protocol metadata. The protocol analyzing module extracts a statement/command from the request. To this end, the protocol analyzing module needs to be aware of the applicable application protocol structures. Statements/commands extracted by the protocol analyzing module are then passed to the statement/command parser for evaluation. The statement/command parser may successfully parse the statement/command extracted by the protocol analyzing module, in which case the statement is then evaluated against one or more security policies. As also previously described, in certain situations, however, the statement/command parser cannot successfully parse the statement/command extracted by the protocol analyzing module.

In the example embodiment shown in FIG. 3, the agent 302 and security mechanism comprise a network protection solution (NPS). Typically, the connection between the client 306 and the server 308 occurs in a secure manner, preferably over SSL/TLS. The use of Secure Sockets Layer (SSL) and/or Transport Layer Security (TLS)-based encryption for network communications generally inhibits the ability to identify and mitigate threat traffic from within the network. As is also well-known, SSL/TLS connections are carried out at layer 6 of the seven (7) layer OSI network stack model 310, corresponding to the presentation (or syntax) layer, just below layer 7, the application (or end user) layer. The underlying layers of the OSI network stack model 310 include layer 5 (session), layer 4 (transport), layer 3 (network), layer 2 (data link) and layer 1 (physical). As noted above, a standard way to terminate a suspect connection is to close it on the transport (layer 4); the technique of this disclosure, in contrast, preferably works at layer 6 (the presentation layer), as will be described below.

Figure 4:
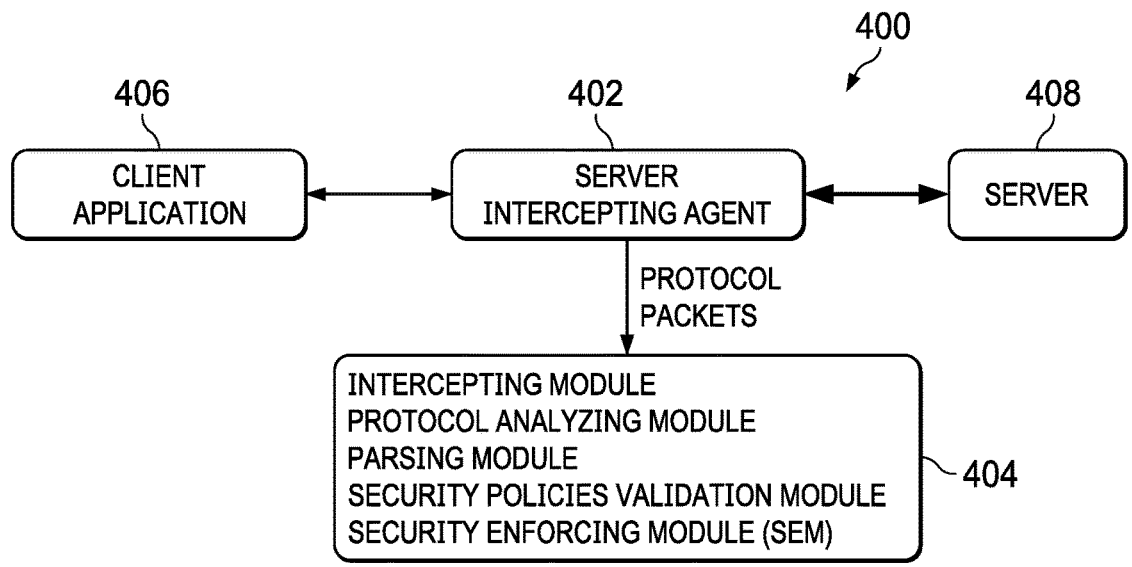
FIG. 4 depicts an access control system (e.g., for an application server) that is structured with a security mechanism in accordance with the technique shown in FIG. 3.

By way of additional background, FIG. 4 depicts the basic operation of a NPS configured as an application server access control system 400 that comprises a server intercepting agent 402 and an associated security mechanism, e.g., an external-to-database security mechanism 404. As a skilled person will appreciate, the access control system in FIG. 4 is a special case of the generalized security system architecture depicted in FIG. 3. As depicted in FIG. 4, in this embodiment the agent 402 is situated in-line between a client application 406, and an application server 408. Queries/requests initiated to the server 408 by the client application 406 are intercepted by agent 402, and application protocol packets comprising those queries/requests are forwarded to the security mechanism 404 for evaluation. In this embodiment, the intercepting agent 402 typically also monitors the responses received from the application server 408.

Typically, an application protocol packet refers to a formatted unit of data used in communication between the client application and the application server. In a typical NPS, the security mechanism 404 includes several modules, e.g., an application protocol analyzing module, a query/request parsing module, a security policy validation module, and a security enforcing module (SEM). These modules typically are implemented as software executing in hardware. One core function of the security mechanism is to extract the query/request that is sent by the client application 406 to the application server 408 and intercepted by the agent 402, parse this query up to an application object level, validate it (for potential application object access violations) against one of more security policies. If an access violation is detected, the security mechanism takes a given security action (e.g., a notification, a mitigation or other remediation function).

Figure 5:
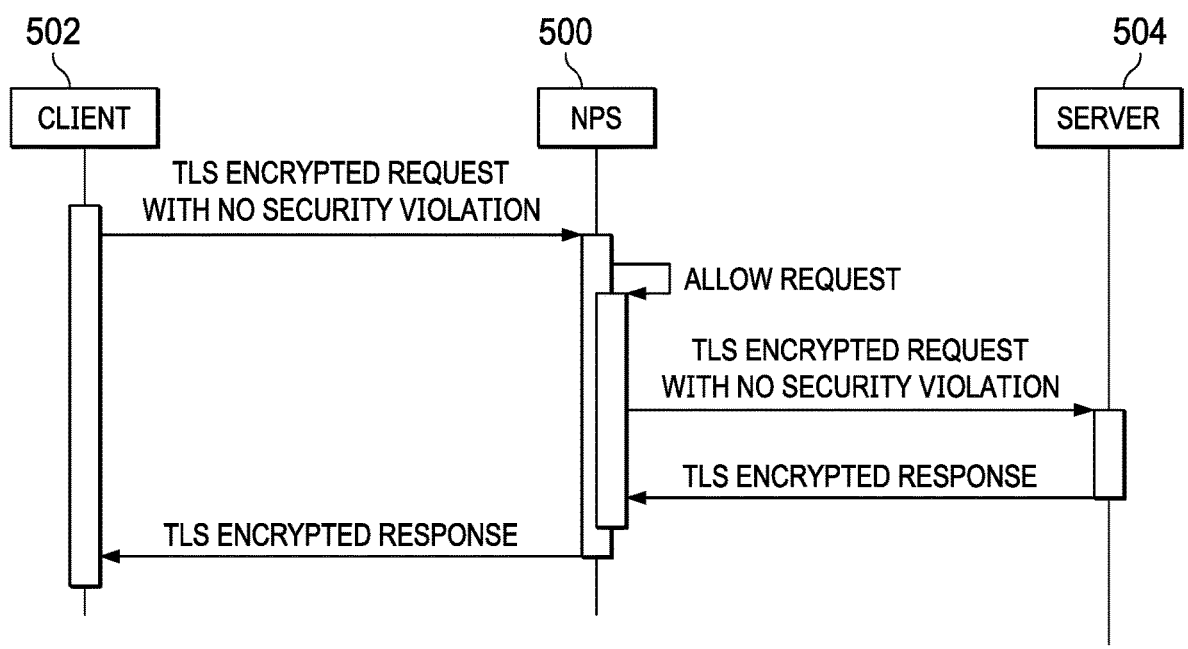
FIG. 5 depicts an operation of an NPS that does not detect a security violation.

FIG. 5 depicts a representative operation of the network protection solution/system (NPS) when a TLS encrypted request does not involve a security violation. It should be appreciated that the nomenclature "security violation" is not intended to be limiting. The NPS may be configured to identify an actual violation (e.g., of some configured security policy), or the NPS may simply observe an operation that it determines to be "anomalous" or other suspicious. In this example, the NPS 500 is positioned intermediate a client 502, and a server 504 (corresponding generally to the configuration shown in FIG. 3). As has been described, the NPS typically operates by intercepting the TLS-encrypted traffic between the endpoints, namely, queries from the client, and responses from the server. The NPS 500 maintain a set of security rules (one or more security policies) defining how to handle each security situation. In the context of an application server access control system, an example security rule uses outlier detection based on access patterns to determine whether a request should be accepted. The NPS 500 may correspond to the agent and security mechanism components in FIG. 4, or it may be operated or configured as a separate computing system. It is not required to have knowledge or logic to assemble application protocol structures.

As depicted, the requesting application client 500 issues a TLS-encrypted request, in this case one that (when intercepted and evaluated by the NPS) will not trigger a security violation determination. The NPS 500 thus allows the TLS-encrypted request to pass through to the application server 504 over the connection depicted. The application server 504 returns a TLS-encrypted response to NPS 500, and that TLS-encrypted response is then passed through the NPS and returned to the application client 502 over the TLS-encrypted connection, which is then closed.

As previously described, the NPS mechanism 500 includes logic to terminate the TLS-encrypted connection (at the transport layer, OSI layer 4), however, when a security anomaly/violation is identified. Shutting down the connection, however, causes an abnormal event (an exception) on the application client side, and the application client 502 typically tries to handle this event by attempting to restore the security-violating connection. This creates communications and processing inefficiencies. This problem is addressed and solved by the subject matter of this disclosure, which is now described.

Graceful Termination of Security-Violating Application Client Connections

According to this disclosure, a network protection system (NPS) such as described includes additional functionality to enable efficient management and handling of security-violating application client connections. To this end, when the NPS determines to suspend a suspect application client connection (e.g., because a security anomaly or violation has been identified), preferably the following action is taken. In particular, preferably the NPS modifies (alters) the request (the TLS encrypted packet) at a random offset to include a random byte value. This creates a modified TLS-encrypted request. The NPS then passes the modified TLS request on to the server. When the modified TLS request is then received at the server, a TLS decryption error occurs, as inclusion of the random byte value in the modified TLS request prevents the request from being decrypted. In response, the server drops the TLS connection gracefully and, in particular, a TLS termination response is returned from the server to the NPS, which then passes the termination response back to the requesting client.

Figures 6, 7:
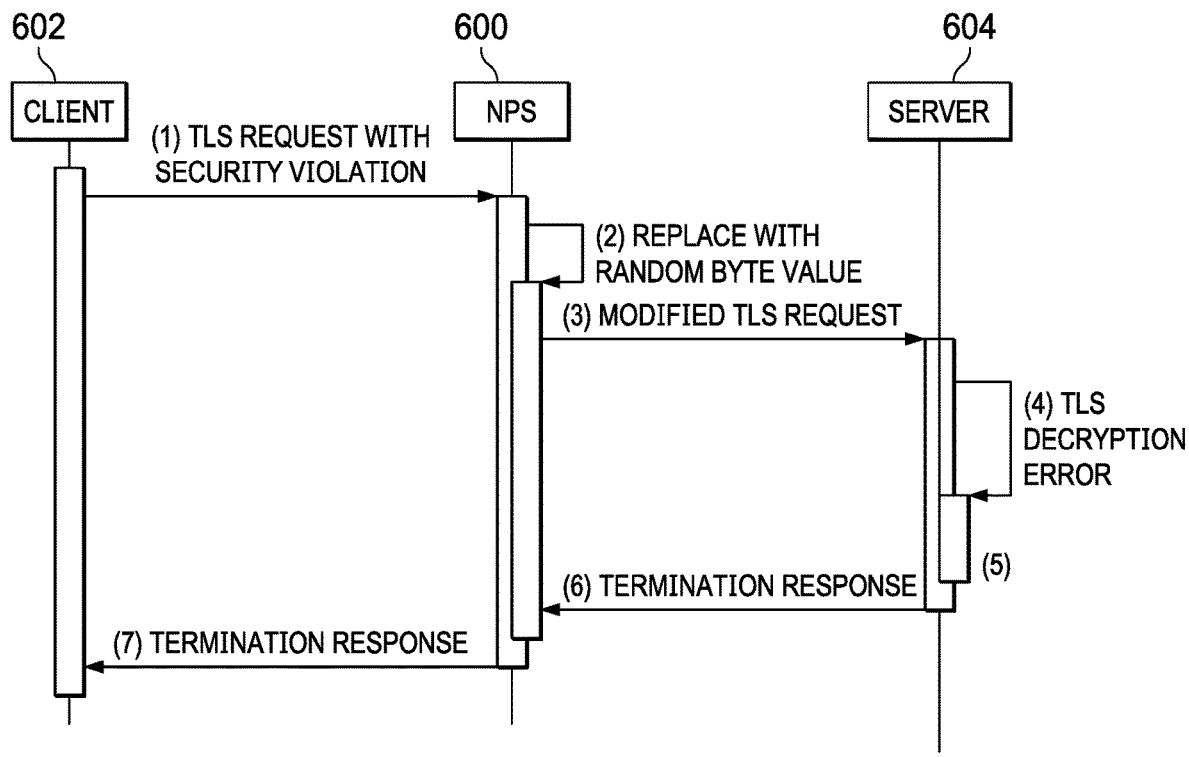
FIG. 6 depicts the processing of a client request by a network protection system (NPS) that has been augmented according to the technique of this disclosure.
FIG. 7 depicts an application layer request that includes modified TLS packet that induces a graceful termination of an encrypted network request according to the technique of this disclosure.

FIG. 6 depicts this operation in detail. In this example, NPS 600 has been augmented to include the above-described functionality. The process begins at step (1) with the application client 602 making a TLS-encrypted request over the connection; in contrast to the scenario depicted in FIG. 5, the request here is one that, upon evaluation by NPS 600, will generate a security violation. Thus, and as depicted, upon determining that the TLS-encrypted request is suspect, the NPS 600 creates an altered (modified) request, preferably by injecting a random byte value; this is step (2). At step (3), the NPS 600 forwards the TLS request so modified to the application server 604; thus, and from the application client and application server perspective, the connection remains open. The nature and semantics of the packet injection are described and illustrated below (by example), but they may depend on the application protocol and thus are protocol-specific. In a representative scenario, a random byte value is simply injected at a random offset within the request. In a variant, the byte value and/or offset need not necessarily be random, as long as it or they are sufficiently varying or otherwise difficult for an attacker to determine. The application server 604 responds at step (4) with a decryption error, as the request (with the included random byte value) can no longer be decrypted by the server. In response at step (5), NPS 600 closes the socket, which had previously been opened between the NPS 600 and the application server 604. While step (5) is shown as closing the socket, other actions that may be taken could include detaching a shared memory segment, or the like. In this example, the application server 604 then responds at step (6) with a termination response. This operation gracefully terminates the NPS-application server interaction with respect to the request, and it releases resources (on the application server) that were otherwise attached to the client connection. At step (7), the NPS 600 then returns the termination response to the application client 602 to complete the process.

Because the operation depicted in FIG. 6 takes place within the SSL/TLS connection (i.e., within OSI presentation layer 6), the NPS 600 itself is not required to decrypt the traffic, and thus it does not have to understand the application protocol structure.

FIG. 7 depicts how a TLS request message may be modified in the manner described above to induce a graceful termination of the encrypted network request. In this example, the NPS modifies the TLS packet 700 to includes a random value (e.g., 0xf7) 702 at a random offset (e.g., 0x48). In this example, header 0x170301 identifies a network packet with application data and TLS v.1 encryption. By just replacing a single byte at the random offset with the random value, the application server is caused to gracefully close the connection (because the request cannot be decrypted).

According to a further aspect of this disclosure, the above-described technique may be leveraged to prevent decryption of secret data, e.g., when session keys are compromised. When the NPS determines that the violation involves compromise of key material itself (e.g., a session key is available to a malicious interceptor), one or more additional random (or other varying) changes may be applied to the packet by the NPS to ensure that the malicious actor is unable to succeed. Thus, for example, if just one byte is modified (the typical embodiment, as described above), the malicious actor may attempt a brute force attack to attempt to restore the original TLS packet from the modified one and thus be able to decrypt the packet. To do so, the malicious actor would need approximately $2^{14}$ attempts, namely, [(packet size)−(TLS header size)]*256/2= (100*128) attempts, to restore the original packet. To defeat this type of brute force attack, the NPS injects additional random changes to the packet. For example, if ten (10) random bytes at injected at random offsets in a packet with 105 bytes, the number of brute force attempts needed to reverse engineer the original packet rises to approximately $2^{126}$ attempts, which is not computationally-feasible.

Regardless of the number of random byte values inserted into the request (before it is passed from NPS to the server), the reason that the connection failure has occurred is obscured from the requesting client. Thus, even if the client then re-establishes or attempts to re-establish the connection, the malicious request containing the violation is already blocked from being handled by the server.

Although not required, when a security violation is detected (and the connection gracefully closed as described), the NPS may undertake an additional assessment/investigation of the security violation. Further action may then be taken depending on the results of this evaluation. Typically, the action is implementation-specific, e.g., restricting the client from further access to the server, sandboxing additional requests initiated by the client, logging the request (and any result of the follow-on analysis), issuing a notification or alert, and so forth. When implemented, this additional processing (analysis, investigation, etc.) may be performed by the NPS natively, or the NPS may leverage other systems, devices, applications, processes, data structures, and the like. The nature of any follow-on evaluation by the NPS is not a limitation of this disclosure.

With respect to a security violating-suspended connection, various types of information (e.g., OS session information such as remote client process ID and remote OS caller process ID, remote terminal ID, physical path to client program, client program memory snapshot, etc.) can be collected.

Thus, according to this disclosure, upon determination by the NPS that the request is suspicious (or otherwise actually violates some applicable security rule), the request is modified before being passed to the application server, where it is then dropped and the application server connection (from the NPS) is closed gracefully.

The subject matter herein provides numerous advantages. The approach is simple to implement, as all that is required is that the NPS be configured to modify the TLS-encrypted request before passing it to the application server. The technique prevents the application client from reaching the application server, and it enables any impacted server resources to be otherwise released and thus available to service other legitimate requests (from other clients). This approach thus provides for an improved network protection system that provides consistent security check validations on client queries/requests, e.g., those passed via the intercepting agent. The approach is scalable, and it assures that NPS can operate efficiently at all times irrespective of load(s) presented by the request and response traffic flows. The approach increases the overall accuracy and throughput of the system significantly, all without requiring additional database server host resources.

Handling connections at the OSI presentation layer in the manner described has significant advantages over doing so in other layers, foremost in that it provides a mechanism to gracefully terminate requests in a universal, application-independent manner.

As described, the approach works by blocking data from being sent from the client to the server in the first instance. For example, assume a policy determines that personally-identifiable information (PII) should not be sent to a specific IP address, as there are unauthorized users who might then access this data. The NPS identifies the anomalous behavior and changes the payload in the manner described, thus the server is unable to decrypt the traffic and the data does not reach malicious parties.

The technique herein has the further advantage in that it prevents distributed denial-of-service attacks, because inspecting the packets and terminating connections occurs before the packets arrive at the server.

Generalizing, the enhanced NPS functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. As noted, the techniques herein may be practiced in a loosely-coupled server (including a "cloud"-based) environment. The security server itself (or functions thereof, such as the monitor process) may be hosted in the cloud. A representation commercial NPS in which the described technique may be implemented is IBM® Guardium®, but this is not a limitation. That solution provides Database-as-a-service (DBaaS) protection, using a light-weight software agent (S-TAP) installed on a database server system, or an MITM proxy (external S-TAP) outside of the database server system; the agent monitors database traffic and forwards information about that traffic to a Guardium® database protection system (DPS).

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

In a representative embodiment, the NPS, or the agent and security mechanism components, as the case may be, are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the NPS (or agent/security mechanism) described above.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques disclosed herein are not limited to a multi-component transaction processing environment, but this will be a typical implementation. As noted, the above-described function may be used in any system, device, portal, site, or the like wherein server-set session management data might be re-used (either by an original user in a different session, or by another user) through the same client browser.

The technique described herein is not limited for use with any particular network protection mechanism or application protocol, and it may be applied in other access control schemes generally. Thus, while the depicted approach is a preferred operating environment, the approach may be implemented in any application access scheme wherein TLS-encrypted client requests are processed for potential security violations in the manner described.

The techniques herein provide for improvements to another technology or technical field, namely, access control systems, as well as improvements to the operational capabilities of such systems when used in the manner described.

The technique herein of gracefully terminating a client-server connection by altering a packet at the presentation layer of the network stack in response to detecting anomalous behavior (e.g., a security violation) may be applied in other protocols that operate at this layer of the OSI network stack. Other such protocols include, for example, SSH, FTP, IMAP, and the like.

Having described our invention, what we claim is as follows.

The invention claimed is:

1. A method operative in a network wherein requests directed from a client to a server are communicated according to a network stack model having a plurality of layers, comprising:
   at a network device:
      monitoring requests directed from the client to the server;
      detecting anomalous behavior associated with a request directed from the client to the server; and
      responsive to detecting anomalous behavior, terminating the request at the network device in an application-independent manner by modifying a packet associated with the request at a presentation layer of the network stack model, thereby generating a modified request, and forwarding the modified request to the server;
   wherein modifying the packet induces a server error.

2. The method as described in claim 1 wherein the network stack model is Open Stack Interconnection (OSI) and the presentation layer is Secure Sockets Layer (SSL)/Transport Layer Security (TLS).

3. The method as described in claim 2 wherein the packet is encrypted and is modified by injecting a random byte value at a random offset of the packet.

4. The method as described in claim 3 wherein the server error is a decryption error caused by injecting the random byte value at the random offset of the encrypted packet.

5. The method as described in claim 1 wherein the client is not provided with information from which it can determine a cause of terminating the request.

6. The method as described in claim 1 further including applying one or more additional random changes to the packet to inhibit a brute force determination of original contents of the packet.

7. Apparatus operative in a network wherein requests directed from a client to a server are communicated according to a network stack model having a plurality of layers, comprising:
   a processor;
   computer memory holding computer program instructions executed by the processor, the computer program instructions comprising program code configured to:
      monitor requests directed from the client to the server;
      detect anomalous behavior associated with a request directed from the client to the server; and
      responsive to detecting anomalous behavior, terminate the request at the apparatus in an application-independent manner by (i) modifying a packet associated with the request at a presentation layer of the network stack model, thereby generating a modified request, and (ii) forwarding the modified request to the server;
   wherein modifying the packet induces a server error.

8. The apparatus as described in claim 7 wherein the network stack model is Open Stack Interconnection (OSI) and the presentation layer is Secure Sockets Layer (SSL)/Transport Layer Security (TLS).

9. The apparatus as described in claim 8 wherein the packet is encrypted and the program code is further configured to modify the packet by injecting a random byte value at a random offset of the packet.

10. The apparatus as described in claim 9 wherein the server error is a decryption error caused by injecting the random byte value at the random offset of the encrypted packet.

11. The apparatus as described in claim 7 wherein the client is not provided with information from which it can determine a cause of terminating the request.

12. The apparatus as described in claim 7 wherein the program code is further configured to apply one or more additional random changes to the packet to inhibit a brute force determination of original contents of the packet.

13. A computer program product in a non-transitory computer readable medium, the computer program product holding computer program instructions executed by a data processing system operative in a network wherein requests directed from a client to a server are communicated according to a network stack model having a plurality of layers, the computer program instructions comprising program code configured to:
   monitor requests directed from the client to the server;
   detect anomalous behavior associated with a request directed from the client to the server; and
   responsive to detecting anomalous behavior, terminate the request at the data processing system in an application-independent manner by (i) modifying a packet associated with the request at a presentation layer of the network stack model, thereby generating a modified request, and (ii) forwarding the modified request to the server;
   wherein modifying the packet induces a server error.

14. The computer program product as described in claim 13 wherein the network stack model is Open Stack Interconnection (OSI) and the presentation layer is Secure Sockets Layer (SSL)/Transport Layer Security (TLS).

15. The computer program product as described in claim 14 wherein the packet is encrypted and the program code is further configured to modify the packet by injecting a random byte value at a random offset of the packet.

16. The computer program product as described in claim 15 wherein the server error is a decryption error caused by injecting the random byte value at the random offset of the encrypted packet.

17. The apparatus as described in claim 13 wherein the client is not provided with information from which it can determine a cause of terminating the request.

18. The apparatus as described in claim 13 wherein the program code is further configured to apply one or more additional random changes to the packet to inhibit a brute force determination of original contents of the packet.

* * * * *